US 8,643,895 B2

(12) United States Patent
Yamada

(10) Patent No.: US 8,643,895 B2
(45) Date of Patent: Feb. 4, 2014

(54) IMAGE PROCESSING DEVICE CAPABLE OF SAVING INK CONSUMPTION

(75) Inventor: Ryuji Yamada, Ogaki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 490 days.

(21) Appl. No.: 12/884,581

(22) Filed: Sep. 17, 2010

(65) Prior Publication Data

US 2011/0116113 A1  May 19, 2011

(30) Foreign Application Priority Data

Nov. 13, 2009 (JP) ................................ 2009-259578

(51) Int. Cl.
G06K 15/02 (2006.01)
G06K 15/00 (2006.01)
H04N 1/60 (2006.01)

(52) U.S. Cl.
USPC ......... 358/1.9; 358/1.11; 358/1.18; 358/3.11; 358/3.12

(58) Field of Classification Search
USPC ............... 358/1.9, 1.11, 1.2, 1.14, 1.18, 3.11, 358/312, 2.1, 1.15, 280, 459, 450, 401, 406, 358/465, 471, 502, 501, 528, 537, 448, 452, 358/462, 474; 382/268, 266, 198, 199, 252, 382/254, 256, 165, 203, 162, 164, 182; 345/660, 467, 468, 469.1, 469, 472, 345/472.1, 551, 552
See application file for complete search history.

(56) References Cited

U.S. PATENT DOCUMENTS

| 6,166,751 A | 12/2000 | Yamada |
| 2008/0174801 A1* | 7/2008 | Asai ............................... 358/1.9 |
| 2009/0034002 A1 | 2/2009 | Shibaki et al. |
| 2010/0232690 A1* | 9/2010 | Kanatsu et al. ............... 382/165 |
| 2011/0109929 A1* | 5/2011 | Korndoerfer ................. 358/1.11 |

FOREIGN PATENT DOCUMENTS

| JP | 9-123524 A | 5/1997 |
| JP | H09-261480 | 10/1997 |
| JP | 11-95618 A | 4/1999 |
| JP | 2004-157190 A | 6/2004 |
| JP | 2004-157904 | 6/2004 |
| JP | 2009-37283 A | 2/2009 |

OTHER PUBLICATIONS

Japanese Official Action dated Jan. 22, 2013 from related application JP 2009-259578 together with an English language translation.

* cited by examiner

*Primary Examiner* — Benny Q Tieu
*Assistant Examiner* — Ngon Nguyen
(74) *Attorney, Agent, or Firm* — Scully, Scott, Murphy & Presser, P.C.

(57) ABSTRACT

An image processing device includes an acquiring unit, a rendering unit, and a mode determination unit. The acquiring unit acquires an input data including a character in a first size. The rendering unit renders an output image based on the input data. The mode determination unit determines whether or not a prescribed mode in which a consumption of printing material is reduced while printing the output image is designated. If the mode determination unit determines that the prescribed mode is designated, the rendering unit renders the output image of the character in a second size smaller than the first size.

10 Claims, 8 Drawing Sheets

Fig. 1(a)

SAVE MODE OFF

SOLUTION OF PRESENT INVENTION
・WHEN SAVE MODE IS ON, FONT SIZE OF DESIGNATED CHARACTER IS CONVERTED INTO SMALLER FONT SIZE BY DESIGNATED %.
・AT THIS TIME, POSITON OF EACH CHARACTER IS MAINTAINED THE SAME IN ORDER TO AVOID CHANGING IN LAYOUT SUCH AS THE NUMBER OF CHATACTERS ALIGNED IN LONGITUDINAL OR WIDTHWISE DIRECTION.

Fig. 1(b)

SAVE MODE ON

SOLUTION OF PRESENT INVENTION
・WHEN SAVE MODE IS ON, FONT SIZE OF DESIGNATED CHARACTER IS CONVERTED INTO SMALLER FONT SIZE BY DESIGNATED %.
・AT THIS TIME, POSITON OF EACH CHARACTER IS MAINTAINED THE SAME IN ORDER TO AVOID CHANGING IN LAYOUT SUCH AS THE NUMBER OF CHATACTERS ALIGNED IN LONGITUDINAL OR WIDTHWISE DIRECTION.

IMAGE PROCESSING DEVICE CAPABLE OF SAVING INK CONSUMPTION

CROSS REFERENCE TO RELATED APPLICATION

This application claims priority from Japanese Patent Application No. 2009-259578 filed Nov. 13, 2009. The entire content of this priority application is incorporated herein by reference.

TECHNICAL FIELD

The present invention relates to an image processing device and computer readable storage program for drawing an output image based on an input data.

BACKGROUND

A conventional electrophotographic laser printer or an inkjet printer is capable of printing in a save mode so as to suppress consumption of printing materials such as toner or ink.

According to one of methods used in the save mode, printing of each respective dot is thinned out. Another method is used in the save mode, in which a save-mode dither matrix, instead of a normal-mode dither matrix, is used to binarize data. Each dot in the save-mode dither matrix is assigned with a value that is larger than a threshold value assigned to each dot in the normal-mode dither matrix. Thus, a gradation number is reduced in the save mode in comparison with a normal mode and thereby reduces the density.

Any conventional method used in the save mode has a problem that the visibility of characters is reduced. For example, thinning out each respective dot makes it difficult to discern small letters. Also, reducing the gradation number makes it difficult to make out variations in light and shade, making it difficult to see characters that have been set to a faint color.

SUMMARY

In view of the foregoing, it is an object of the invention to provide an image processing device and a computer readable storage medium capable of generating an output image in a save mode to reduce consumption of printing material while preventing a reduction in the visibility of characters.

In order to attain the above and other objects, the invention provides an image processing device. The image processing device includes an acquiring unit, a rendering unit, and a mode determination unit. The acquiring unit acquires an input data including a character in a first size. The rendering unit renders an output image based on the input data. The mode determination unit determines whether or not a prescribed mode in which a consumption of printing material is reduced while printing the output image is designated. If the mode determination unit determines that the prescribed mode is designated, the rendering unit renders the output image of the character in a second size smaller than the first size.

According to another aspect, the present invention provides a non-transitory computer readable storage medium storing a set of program instructions installed on and executed by a computer for controlling an image processing device. The program instructions include acquiring an input data including a character in a first size, rendering an output image based on the input data, determining whether or not a prescribed mode in which a consumption of a printing material is reduced while printing the output image is designated, wherein if the determination step determines that the prescribed mode is designated, the rendering step renders the output image of the character in a second size smaller than the first size.

BRIEF DESCRIPTION OF THE DRAWINGS

The particular features and advantages of the invention as well as other objects will become apparent from the following description taken in connection with the accompanying drawings, in which:

FIG. 1(a) is an explanatory diagram showing a print result when a save mode is not designated according to a first embodiment of the present invention;

FIG. 1(b) is an explanatory diagram showing a print result when the save mode is designated according to the first embodiment of the present invention;

DETAILED DESCRIPTION

Figure 2:
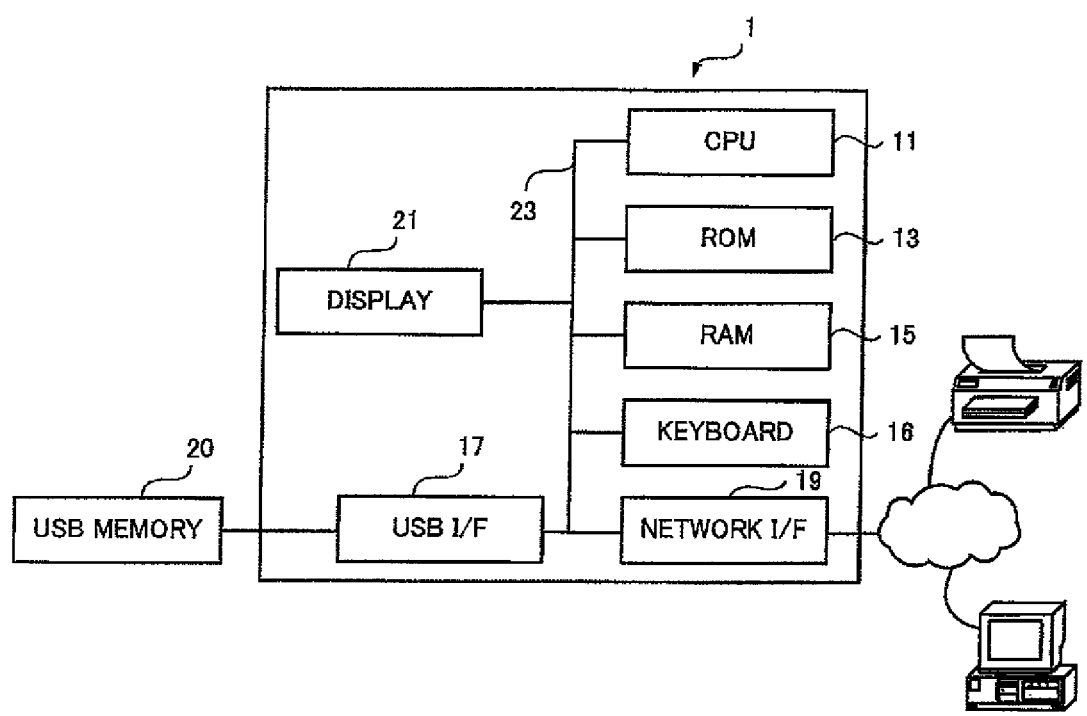
FIG. 2 is a block diagram showing a structure of a personal computer in which a printer driver according to the first embodiment of the present invention is installed.

Embodiments of the invention will be described while referring to the accompanying drawings wherein like parts and components are designated by the same reference numerals to avoid duplicating description. The embodiments pertain to a printer driver for converting data generated by an application software, i.e., software designed for a specific purpose such as a document creation or a numerical calculation, (hereinafter referred to as application data) into data readable by a printer.

First Embodiment

FIGS. 1(a) and 1(b) are print data generated by the printer driver according to the first embodiment.

As shown in FIG. 1(b), when the save mode is designated, the printer driver generates print data with a character font size reduced from a designated font size shown in FIG. 1(a) by a predetermined factor. Because dots that form a character are not thinned out, a smooth character contour is maintained. Furthermore, since the gradation number does not change even in the save mode, the characters do not become faint and indistinct.

The printer driver generates print data while maintaining the same character position before and after the font size reduction. This maintains the same layout, i.e., the number of rows, the number of columns, and line feed positions as shown in FIGS. 1(a) and 1(b).

Next, a configuration of a personal computer (hereinafter abbreviated as PC) in which the printer driver is installed will be described while referring to FIG. 2.

The PC 1 includes a CPU 11, a ROM 13, a RAM 15, a keyboard 16, a USB I/F 17, a network I/F 18, a display 21, and a bus 23.

The CPU 11 performs overall control of the PC 1. The ROM 13 stores various programs including a print data generation process of the printer driver to be executed by the CPU 11. An application software program installed in the PC 1 is stored in a HDD (Hard Disk Drive, not shown). The RAM 15 is used as a storage region for temporarily storing data generated in a various process by the CPU 11, and has a rendering area, a density setting storage area, and a separate area. A user operates the PC 1 via the keyboard 16. The USB I/F 17 connects a USB memory 20 to the PC 1. The PC 1 is connected to a network through the network I/F 19. The display 21 is a display device such as a LCD (Liquid Crystal Display) and is for displaying an operation screen. These components are connected with each other via the bus 23.

The printer driver generates print data based on an application data generated by operation of the application software installed in the PC 1 by the user, an application data stored in the USB memory 20, or an application data acquired from a network PC.

Figure 3:
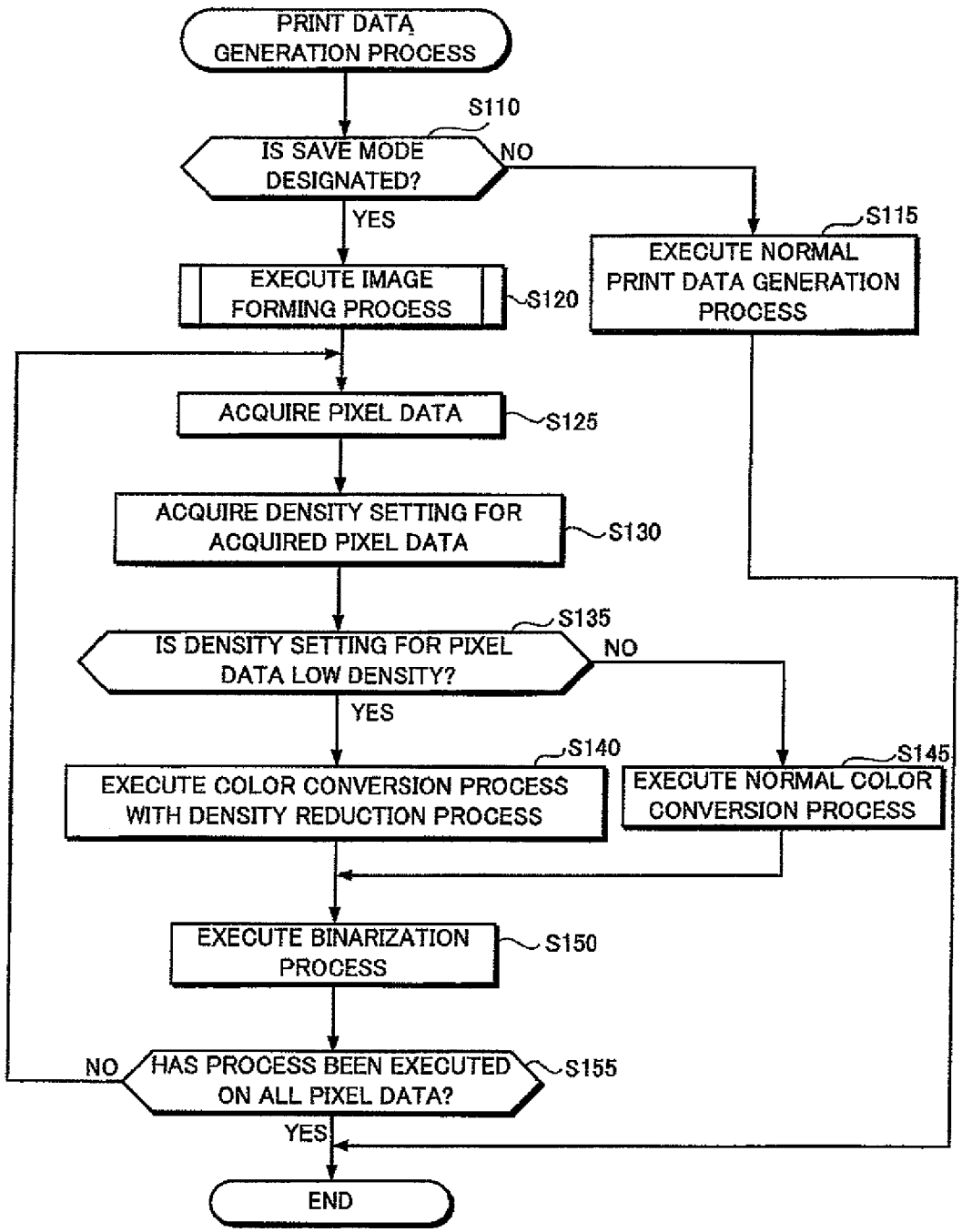
FIG. 3 is a flowchart illustrating steps in a print data generation process according to the first embodiment of the present invention.

Next, the print data generation process of the printer driver according to the first embodiment will be described with reference to a flowchart of FIG. 3.

The print data generation process is started when a user operates the PC 1 to instruct printing of application data. When the print data generation process is started, in S110, the CPU 11 determines whether or not the save mode is designated in the printer driver. In this embodiment, the user can previously designate the save mode as a setting item in the printer driver, and the CPU 11 determines in S110 whether the user has designated the save mode.

When the CPU 11 determines that the save mode has not been designated (NO: S110), then the CPU 11 executes a normal print data generation process in S115, and then ends the print data generation process. The normal print data generation process is a known process in which such a rendering command as a character rendering command, an image rendering command, a graphics rendering command, and the like is acquired from application software and an RGB image is formed according to the rendering command, color-converted into an CMYK image, and then binarized.

On the other hand, when the CPU 11 determines that the save mode has been designated (YES: S110), then in S120 the CPU 11 executes the image forming process for forming an RGB image for the save mode. Details will be described later. The RGB image formed by the image forming process is stored in the RAM 15. The RGB image is raster data configured by RGB values.

Next in S125 the CPU 11 acquires a set of pixel data of the RGB image.

Then in S130 the CPU 11 acquires a density setting for the acquired set of pixel data. Note that the density setting for each set of pixel data has been determined in the image forming process and stored in the RAM 15 as described later. The density setting may or may not have been set to a low density.

In S135, the CPU 11 determines whether or not the density setting for the set of pixel data is a low density.

If so (YES: S135), then in S140 the CPU 11 executes a color conversion process together with a density reduction process.

In the color conversion process executed together with the density reduction process in S140, the RGB value of the pixel data is color converted to a CMYK value while reducing the CMYK value by a predetermined proportion. The CMYK value may be reduced after converting the RGB value to a CMYK value with a normal-mode profile. Alternatively, a toner-save-mode profile for converting into the CMYK value while reducing the CMYK value by a predetermined proportion may be used for converting the RGB value to the CMYK value.

On the other hand, if not (NO: S135), then in S145 the CPU 11 executes a normal color-conversion process. In the normal color-conversion process, the RGB value of the pixel data is color converted to a CMYK value with the normal-mode profile.

After completing the color conversion process in either S140 or S145, the CPU 11 executes in S150 a binarization process. In the binarization process, a known area gradation process is performed.

Next in S155 the CPU 11 determines whether or not the above processes have been executed on all pixel data. If not (NO: S155), then the CPU 11 returns to S125 and repeats the processes on a next set of pixel data. On the other hand, if so (YES: S155), then the CPU 11 ends the print data generating process.

Figure 4:
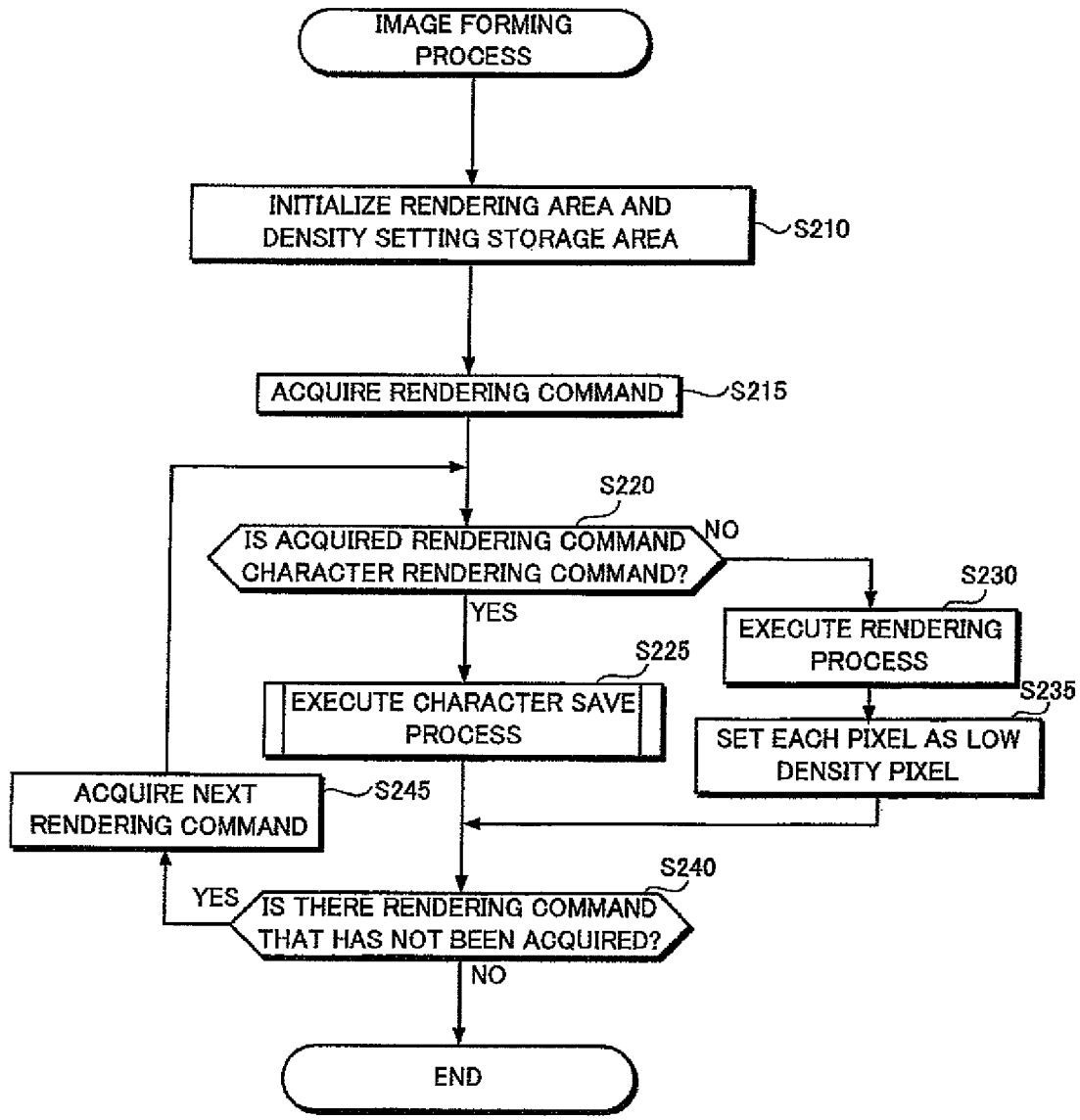
FIG. 4 is a flowchart illustrating steps in an image forming process according to the first embodiment of the present invention.

Next the image forming process will be described with reference to the flowchart of FIG. 4.

When the image forming process is started, in S210 the CPU 11 initializes the rendering area and the density setting storage area in the RAM 15. The rendering area is for storing an RGB image formed by an image forming process of the printer driver, and the density setting storage area is for storing a density setting of the RGB image. Initialization needs to be performed in S210 because an RGB image that corresponds to previous application data and that has been formed by a previous image forming process remains stored in the rendering area, and because density settings thereof remain stored in the density setting storage area.

Then in S215 the CPU 11 acquires a rendering command from the application software. The rendering command is a character rendering command, an image rendering command, a graphics rendering command, or the like sent from the application software, and is a command instructing how to render characters, images, graphics, or the like. For example, a character rendering command includes information indicating a character to be rendered, coordinates for starting rendering of the character (hereafter referred to as "rendering start coordinates"), a font, a font size, and the like.

After acquiring the rendering command, next in S220 the CPU 11 determines whether the acquired rendering command is a character rendering command.

If so (YES: S220), then in S225 the CPU 11 executes a character save process to be described later. Then the CPU 11 proceeds to S240.

On the other hand, if not (NO: S220), then in S230 the CPU 11 executes a rendering process to render (rasterize) in accordance with the acquired rendering command to thereby form an RGB image in the rendering area. For example, when the acquired rendering command is a graphics rendering command, then graphics are rendered according to the graphics rendering command to thereby form an RGB image of the graphics.

Then in S235 the CPU 11 sets each pixel represented by the pixel data for the RGB image rendered in S230 as a low-density pixel (i.e., sets a density setting for each pixel data to a low density). More precisely, the CPU 11 executes the following process. Numeric data of either "0" or "1" is stored in the density setting storage area as a density setting for each of all the pixel data. The numeric data of "0" is stored for pixel data for which a density will not be reduced, and the numeric data of "1" is stored for pixel data for which a density will be reduced. The initialization in S210 has set all density settings to "0," and the process in S235 changes the density settings for all the pixel data of the RGB image rendered in S230 to "1." This process makes the RGB image rendered in the low density, and thus a consumption of printing material can be saved. After completing the process in S235, the CPU 11 proceeds to S240.

In S240, the CPU 11 determines whether or not there is a rendering command that has not been acquired. If so (YES: S240), then the CPU 11 acquires the next rendering command in S245 and returns to S220.

On the other hand, if not (NO: S240), this means that all rendering commands have been acquired, and thus the CPU 11 ends the image forming process.

Figure 5:
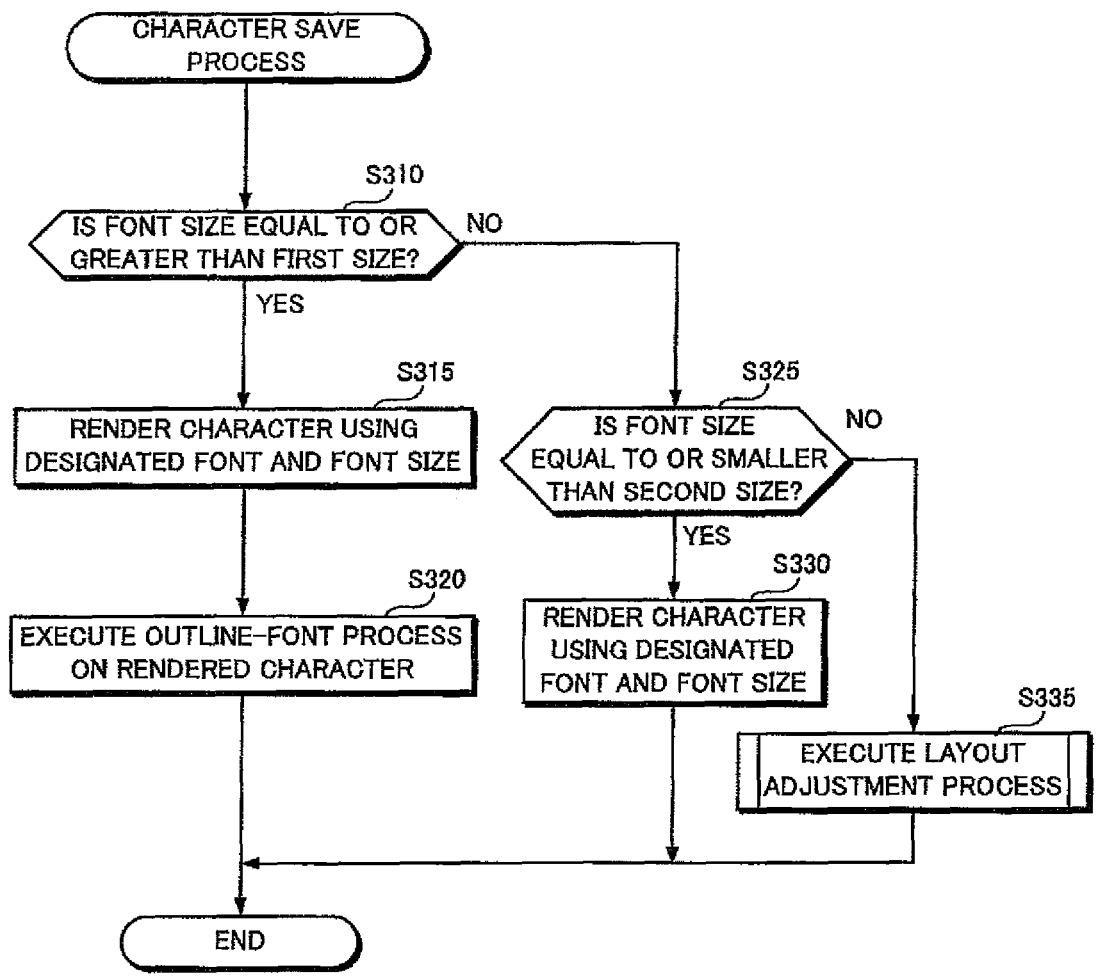
FIG. 5 is a flowchart illustrating steps in a character save process according to the first embodiment of the present invention.

Next, the character save process will be described with reference to the flowchart of FIG. 5.

When the character save process is started, first in S310 the CPU 11 determines whether or not the font size designated by the character rendering command is equal to or greater than a first size (i.e., a first threshold value). The first size has been set in the printer driver by operation by a user of the PC 1. Alternatively, a predetermined value may be provided as a default setting in the printer driver.

If the font size is equal to or greater than the first size (YES: S310), then in S315 the CPU 11 renders the characters designated by the character rendering command in the rendering area using the designated font and font size.

Then in S320 the CPU 11 executes an outline-font process on the rendered characters. The outline-font process is for removing color from portions other than the contour while leaving the contour of a character. For example, a white-colored character having a reduced font size may be superimposed to leave the contour of the character. Alternatively, edge portions of the character may be stored as separate data in the rendering process in S315, and the character rendered in the rendering area in S315 may be overwritten with the separate data.

As described above, when a font size is equal to or greater than the first size, characters are rendered as outline-font characters as a result of the outline-font process in S320. In other words, an RGB image of a character contour is formed in the rendering area.

Thus, importance is placed on the font size intended by a user. For example, when a document including a title and text is prepared by a user, if a font size designated for the title is equal to or greater than the first size, then it is preferred to maintain the designated font size so as to facilitate the distinction between the title and the text. In this case, economic use of printing materials is enabled while maintaining the designated font size by drawing outline-font characters in the title.

After completing the outline-font process in S320, the CPU 11 ends the character save process.

On the other hand, if the font size is not equal to or greater than the first size (NO: S310), then in S325 the CPU 11 determines whether or not the font size is equal to or less than a second size (i.e., a second threshold value). The second size has been set in the printer driver in the same manner as the first size by operation of the PC 1 by a user. Alternatively, a predetermined value may be provided as a default setting in the printer driver.

When it is determined that the font size is equal to or less than the second size (YES: S325), then in S330 the CPU 11 renders the characters designated by the character rendering command in the rendering area in the designated font and font size.

In this manner, if the positive determination is made in S325, then an RGB image is formed while maintaining the designated font size, without reducing the font size. This sets a lower limit on font sizes. Thus, characters can be prevented from becoming overly small and therefore can be reduced within a range in which character recognition is possible.

After S330, the CPU 11 ends the character save process.

When it is determined in S325 that the font size is not equal to or less than the second size (NO: S325), then CPU 11 executes a layout adjustment process and ends the character save process. The layout adjustment process is for forming an RGB image of characters in a reduced font size while maintaining the same character positions before and after the font size reduction. Details will be described later.

The first size may be 20 point, and the second size may be 8 point, for example. Characters in a font size less than 20 point has a low bit number, so it is difficult to form the characters in the outline font. Also, characters in a font size less than 8 point will have reduced visibility if reduced in size.

Figure 6:
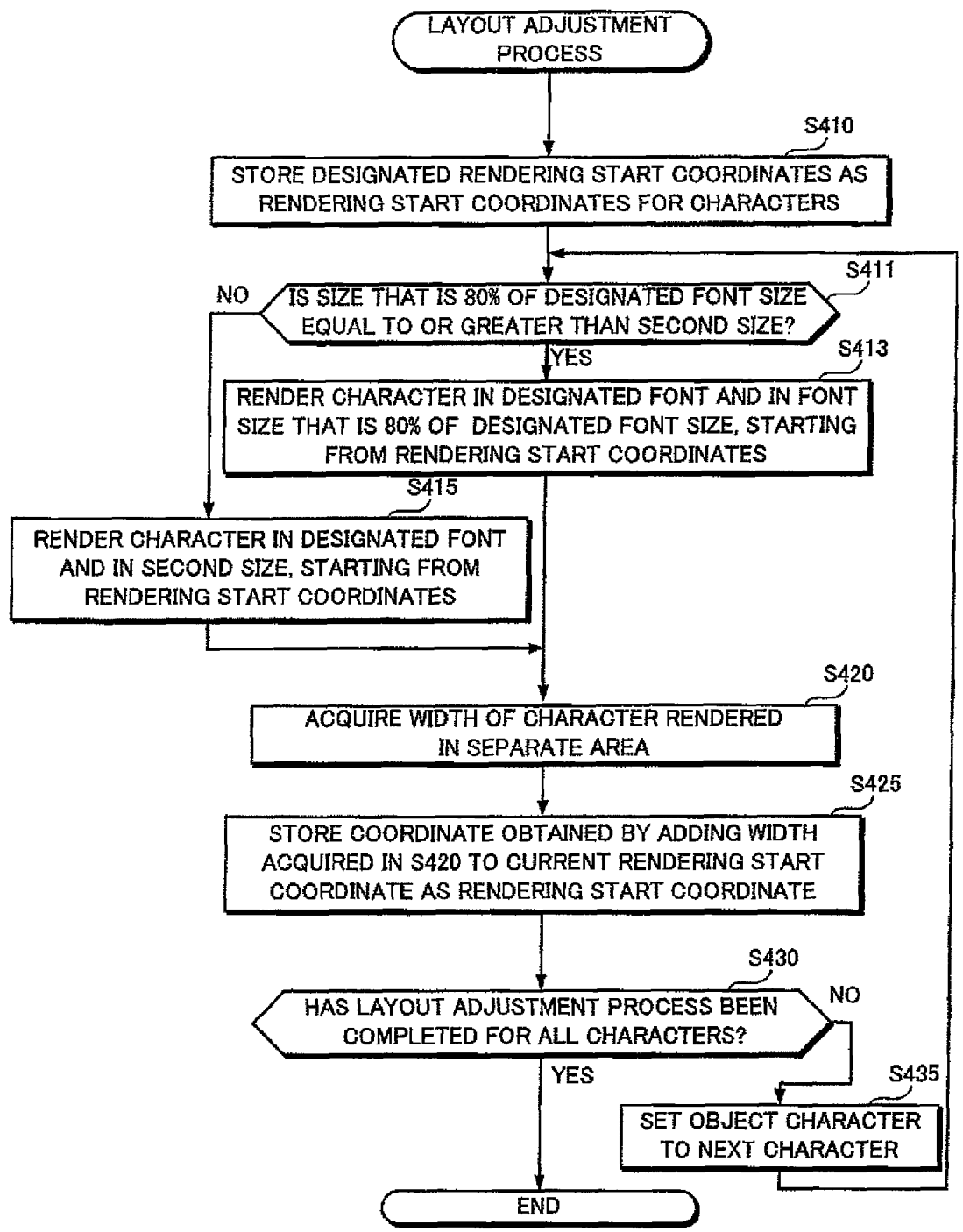
FIG. 6 is a flowchart illustrating steps in a layout adjustment process according to the first embodiment of the present invention.

Next, the layout adjustment process will be described with reference to the flowchart of FIG. 6.

When the layout adjustment process is started, first in S410 the CPU 11 stores the rendering start coordinates designated by the character rendering command in the RAM 15 as rendering start coordinates for characters. Then, the CPU 11 designates a first one of the characters designated by the character rendering command as an object character which is targeted for the current process.

Then in S411 the CPU 11 determines whether or not a size that is 80% of the designated font size is equal to or greater than the second size.

If so (YES: S411), then in S413 the CPU 11 renders the object character in the designated font and in a font size that is 80% of the designated font size, starting from the rendering start coordinates. The reduction ratio of the font size in S413 (80% in this example) may be previously set in the printer driver by operation of the PC 1 by the user. Alternatively, a predetermined value may be provided as a default setting in the printer driver. Then, the CPU 11 proceeds to S420.

On the other hand, if not (NO: S411), then in S415 the CPU 11 renders the object character in the designated font and in the second size, starting from the rendering start coordinates. Then, the CPU 11 proceeds to S420.

As described above, if the designated font size is larger than the second size, and if a font size obtained by reducing the designated front size by a reduction ratio of 80% is smaller than the second size (NO: S325, NO: S411), then the character is rendered by reducing to the second size. This configuration prevents the magnitude relation among characters from being inverted.

For example, assuming that the second size is 8 point (1 point is 1/72 inch), if a font size designated for a first character is 8 point, then the first character is rendered in the designated font size of 8 point without being reduced in size (S330). If a font size designated for a second character is 9 point, then the layout adjustment process is executed (S335). In this layout adjustment process, if the designated front size of 9 point is reduced by 80%, then the resultant font size for the second character becomes 7.2 point, which is smaller than 8 point. As a result, the magnitude relation between the first and second characters is inverted (8: designated font size 8)>(7.2: designated font size 9). Therefore, regarding characters which will become smaller than the second size when reduced in size by 80%, the designated font size is reduced to the second size.

In S420, the CPU 11 renders the object character in the designated font and font size in the separate area in the RAM 15, and acquires a width of the character.

Next in S425 the CPU 11 stores coordinates obtained by adding the width acquired in S420 to the current rendering start coordinates into the RAM 15 as rendering start coordinates for a next character.

Then in S430 the CPU 11 determines whether or not the layout adjustment process has been completed for all the characters designated by the character rendering command.

If so (YES: S430), then the CPU 11 ends the layout adjustment process.

On the other hand, if not (NO: S430), then the CPU 11 sets in S435 the object character to a next one of the designated characters, and returns to S411 so as to determine whether or not a size which is obtained by reducing a font size designated for the object character by 80% is equal to or greater than the second size.

Figure 7:
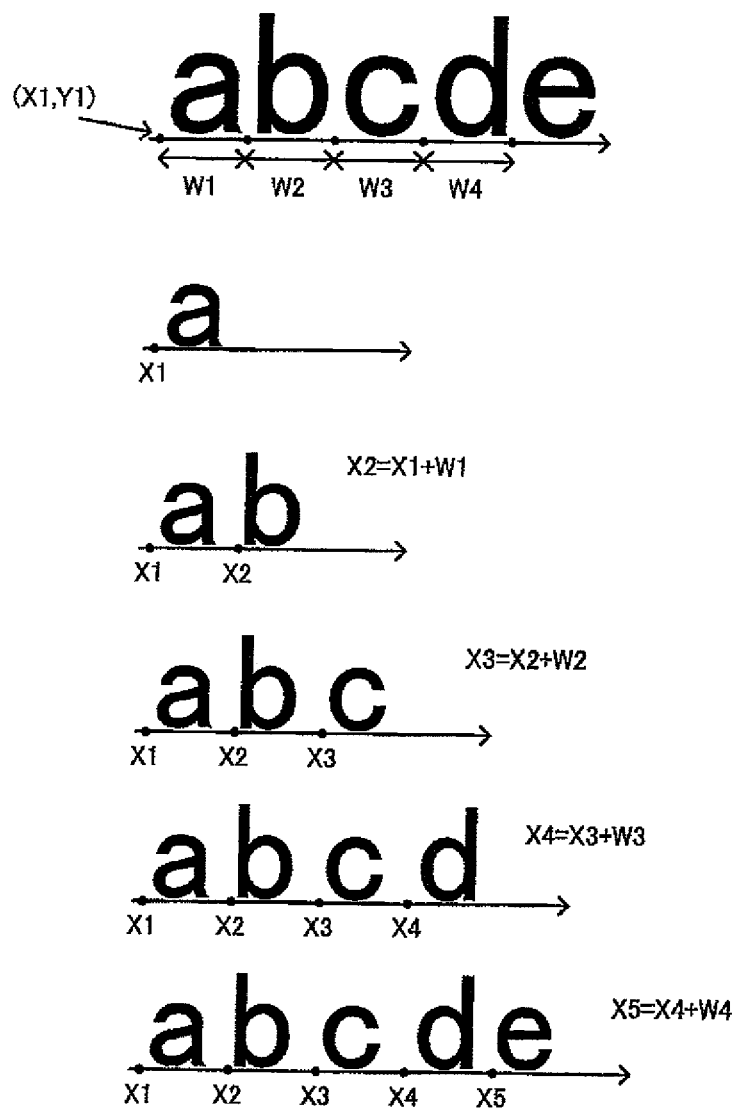
FIG. 7 is an explanatory diagram showing an example of the layout adjustment process according to the first embodiment of the present invention.

A specific example of the layout adjustment process will be described with reference to FIG. 7. In this example, it is assumed that a character rendering command for rendering characters "abcde" in 10-point Gothic font from coordinates (x1, y1). The first size is 20 point, and the second size is 8 point.

First, the CPU 11 stores the coordinates (x1, y1) in the RAM 15 as the rendering start coordinates (S410) and designates the first character "a" as an object character.

Because a size of 80% of the designated font size is equal to the second size (10 point×0.8=8; YES: S411), the object character "a" is rendered in 8-point Gothic font from the coordinates (x1, y1) (S413).

Then, the object character "a" is rendered in 10-point Gothic font in the separate area in the RAM 15, and a width w1 of the rendered object character "a" is acquired (S420).

Rendering start coordinates for a second character (x2, y1: x2=x1 w1) are calculated and stored (S425).

Because the layout adjustment process is not completed for all characters (NO: S430), the process proceeds to S435 to set the object character to the second character "b".

In the same manner as the character "a," the CPU 11 determines that a size of 80% of the designated font size is equal to the second size (YES: S411), and the object character "b" is rendered in 8-point Gothic font from the coordinates (x2, y1) (S413).

The processes of S411 to S435 are repeated until the all characters "abcde" are rendered.

Second Embodiment

Figure 8:
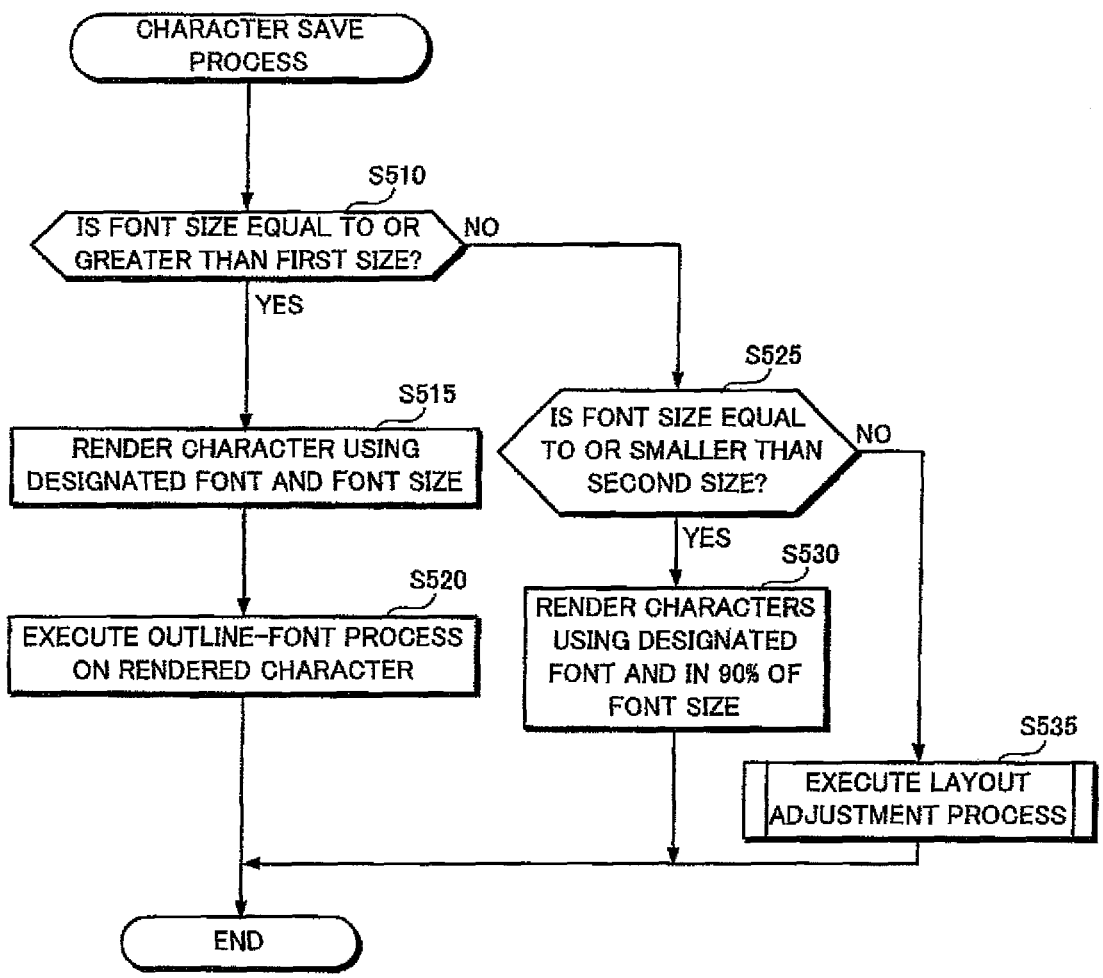
FIG. 8 is a flowchart illustrating steps in a character save process according to a second embodiment of the present invention.

A second embodiment is the same as the first embodiment except a character saving process. Thus, only the character saving process of the second embodiment will be described below with reference to the flowchart of FIG. 8. Since S510-S525 of FIG. 8 is the same as S310-S325 of FIG. 5, the detailed description thereof will be omitted.

If the CPU 11 determines in S525 that the font size is equal to or smaller than the second size (YES: S525), then in S530 the CPU 11 renders in the rendering area the characters in the font designated by the character rendering command and in 90% of the font size designated by the character rendering command. Note that the reduction ratio of the font size used in S530 is previously set in the printer driver by operation of the PC 1 by the user. Alternatively, a predetermined value may be provided as a default setting in the printer driver. Upon completion of S530, the CPU 11 ends the character saving process.

On the other hand, if the CPU 11 determines in S525 that the font size is not equal to or smaller than the second size (NO: S525), then in S535 the CPU 11 executes the same layout adjustment process as that in the first embodiment (FIG. 6). Then, the CPU 11 ends the character saving process.

In this second embodiment, if the font size is equal to or smaller than the second size, then the characters are rendered with a reduction ratio of 90% (S530). On the other hand, if the font size is greater than the second size (NO: S525) and if the font size that is 80% of designated font size is equal to or greater than the second size (YES: S411), then the characters are rendered with a reduction ratio of 80% (S413). Raising the reduction ratio of font sizes equal to or smaller than the second size to 90% prevents the characters from becoming too small and thus being viewed with reduced visibility.

While the invention has been described in detail with reference to the embodiments thereof, it would be apparent to those skilled in the art that various changes and modifications may be made therein without departing from the spirit of the invention.

The embodiments have been described using printer drivers as examples; however, the present invention is not limited to printer drivers and may be applied to any terminal devices that perform image processing to generate print data. For example, the terminal devices may be printers or multifunction devices that perform image processing to generate print data to carry out printing, or may be display devices that perform image processing and that display generated images.

In the above embodiments, characters and rendering start coordinates are determined based on the rendering command of application software. However, the present invention is not limited thereto. For example, characters may be recognized and extracted from such image data as scanned image data using such a generally known method as OCR, and thus extracted characters may be reduced in size. Also, coordinates of thus extracted characters may be detected before reducing the characters in size, and the reduced characters may be rendered using the detected coordinates as the rendering start coordinates.

Also, in the above-described embodiments, if the CPU 11 determines in S110 that the save mode is designated in the printer driver, then the process proceeds to S120. However, the present invention is not limited thereto. For example, the save mode may be set in the PC 1 by default to omit S110. Also, it may be determined whether a command (PS command, PCL command, or the like) received by a printer or multifunction device includes a command specifying the save mode.

Also, in the above-described embodiments, in processing a rendering command other than a character rendering command, a density setting for each set of pixel data of an RGB image is set to a low density in S235. However, the present invention is not limited thereto. For example, a method may be used where an RGB image is formed with RGB values reduced by predetermined values.

In the layout adjustment process of the above-described embodiments, the width of a character is added to rendering start coordinates of the character to calculate rendering start coordinates of a next character, and then the next character is rendered from the calculated rendering start coordinates. However, the present invention is not limited thereto. For example, coordinates of the center of a character may be calculated, and a reduced character may be rendered in such a manner that the center of the reduced character is located at the calculated coordinates. Alternatively, an area occupied by a character may be calculated, and a reduced character may be freely rendered within the calculated area.

In the above-described embodiments, the reduction ratio (reduced font size/initial font size) is used as a reduction amount of characters. However, the present invention is not limited thereto. For example, characters having a font size larger than the second size may be reduced in size by a given number of points, e.g., 5 points.

In the layout adjustment process of the above-described embodiments, the process returns from S435 to S411. However, the present invention is not limited thereto. For example, if all characters to be rendered have the same font size, then the process of S411 following S435 may be omitted. In this case, if the first character is rendered in S413, the process returns from S435 to S413 such that the second and later characters are rendered in S413. If the first character is rendered in S415, on the other hand, the process returns from S435 to S415 such that the second and later characters are rendered in S415.

What is claimed is:

1. An image processing device comprising:
   a processor;
   and a storage device storing computer readable instructions executable by the processor to configure the processor to function as:
   an acquiring unit that acquires a character rendering command including:
      a character to be rendered,
      a position coordinate of a left end of the character,
      a first size of the character to be rendered, and
      a font type of the character to be render;
   a rendering unit that renders the character based on the character rendering command; and
   a mode determination unit that determines whether or not a prescribed mode in which a consumption of printing material is reduced while printing the character is designated,
   wherein if the mode determination unit determines that the prescribed mode is designated, the rendering unit renders the character in a second size smaller than the first size included in the character rendering command using the font type included in the character rendering command, and
   wherein a position coordinate of the left end of the character to be rendered when the prescribed mode is designated is the same as a position coordinate of the left end of the character to be rendered when the prescribed mode is not designated.

2. The image processing device according to claim 1, wherein the processor is further configured to function as a coordinate calculation unit that calculates a coordinate position of each character of a plurality of characters in the character rendering command, wherein the rendering unit renders each of the plurality of characters at the coordinate position.

3. The image processing device according to claim 1, wherein the acquiring unit further acquires an image rendering command for rendering an image, and if the acquiring unit acquires both the character rendering command and the image rendering command and the mode determination unit determines that the prescribed mode is designated, the rendering unit renders the character in the second size and the image, without reducing a size of the image, having a density lower than an image which is rendered by the rendering unit when the prescribed mode is not designated.

4. The image processing device according to claim 1, wherein the processor is further configured to function as a reduction ratio setting unit that sets a reduction ratio for the character, wherein the rendering unit renders the character in the second size, which is obtained by reducing the first size by the reduction ratio, the reduction ratio being defined by a ratio of the first size to the second size.

5. The image processing device according to claim 1, wherein if the first size is smaller than a first threshold value, the rendering unit renders the character in the second size, and if the first size is greater than or equal to the first threshold value, the rendering unit renders the character in an outline-font and the first size.

6. The image processing device according to claim 5, wherein if the first size is smaller than or equal to a second threshold value smaller than the first threshold value, the rendering unit renders the character in the first size, and if the first size is greater than the second threshold value and is smaller than the first threshold value, the rendering unit renders the character in the second size.

7. The image processing device according to claim 5, wherein if the first size is smaller than or equal to a second threshold value smaller than the first threshold value, the rendering unit renders the character in a third size reduced from the first size by a first reduction proportion, and if the first size is greater than the second threshold value and is smaller than the first threshold value, the rendering unit renders the character in the second size reduced from the first size by a second reduction proportion greater than the first reduction proportion.

8. The image processing device according to claim 1, wherein if the mode determination unit determines that the prescribed mode is not designated, the rendering unit renders the character in the first size,
   wherein if the mode determination unit determines that the prescribed mode is designated, the rendering unit renders the character in the second size while maintaining a position of the character relative to adjacent characters.

9. A non-transitory computer readable storage medium storing a set of program instructions installed on and executed by a computer for controlling an image processing device, the program instructions comprising:
   acquiring a character rendering command including:
      a character to be rendered,
      a position coordinate of a left end of the character,
      a first size of the character to be rendered, and
      a font type of the character to be rendered;
   rendering the character based on the character rendering command; and
   determining whether or not a prescribed mode in which a consumption of a printing material is reduced while printing the character is designated,
   wherein if the determination step determines that the prescribed mode is designated, the rendering step renders the character in a second size smaller than the first size included in the character rendering command using the font type included in the character rendering command, and
   wherein a position coordinate of the left end of the character to be rendered when the prescribed mode is designated is the same as a position coordinate of the left end of the character to be rendered when the prescribed mode is not designated.

10. An image processing device comprising:
    a processor;

and a storage device storing computer readable instructions executable by the processor to configure the processor to function as:

an acquiring unit that acquires a character rendering command including:
  a character string to be rendered, the character string including a plurality of characters;
  a position coordinate of a center of each of the plurality of characters,
  a first size of the character to be rendered, and
  a font type of the character to be render;
a rendering unit that renders the character based on the character rendering command; and
a mode determination unit that determines whether or not a prescribed mode in which a consumption of printing material is reduced while printing the character is designated,
wherein if the mode determination unit determines that the prescribed mode is designated, the rendering unit renders the character in a second size smaller than the first size included in the character rendering command using the font type included in the character rendering command, and
wherein a position coordinate of the center of the character to be rendered when the prescribed mode is designated the same as a position coordinate of a center of the character to be rendered when the prescribed mode is not designated.

* * * * *